United States Patent
Chang et al.

(10) Patent No.: US 9,203,677 B2
(45) Date of Patent: Dec. 1, 2015

(54) SIGNAL PROCESSING METHOD AND ASSOCIATED APPARATUS

(75) Inventors: Chu-Hsin Chang, Zhubei (TW); Kai-Wen Cheng, Zhubei (TW); Yi-Ying Liao, Taipei (TW); Tung-Sheng Lin, Taoyuan (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 598 days.

(21) Appl. No.: 13/613,182

(22) Filed: Sep. 13, 2012

(65) Prior Publication Data

US 2013/0253867 A1    Sep. 26, 2013

(30) Foreign Application Priority Data

Mar. 26, 2012 (TW) .............................. 101110401 A

(51) Int. Cl.
*H04L 7/02* (2006.01)
*H04L 27/26* (2006.01)
*H04L 7/027* (2006.01)
*H04L 27/00* (2006.01)

(52) U.S. Cl.
CPC ............ *H04L 27/2666* (2013.01); *H04L 7/027* (2013.01); *H04L 2027/0026* (2013.01)

(58) Field of Classification Search
CPC ............ H04L 27/0014; H04L 27/2657; H04L 27/2659; H04L 27/266; H04L 2027/0024; H04L 2027/0026; H04L 2027/003; H04L 2027/0032

USPC ......... 375/316, 344, 346, 348, 355, 356, 357, 375/362, 364
See application file for complete search history.

(56) References Cited

U.S. PATENT DOCUMENTS

| 8,406,345 B2* | 3/2013 | Tseng ............................ 375/326 |
| 2011/0135042 A1* | 6/2011 | Tseng et al. ................... 375/344 |

FOREIGN PATENT DOCUMENTS

| TW | 201121322 A | 6/2011 |
| WO | 2010057974 A1 | 5/2010 |

OTHER PUBLICATIONS

Taiwan Office Action dated Jul. 7, 2014, 6 pages.

* cited by examiner

*Primary Examiner* — Siu Lee
(74) *Attorney, Agent, or Firm* — Edell, Shapiro & Finnan, LLC

(57) ABSTRACT

A signal processing apparatus for receiving a spectral line of an original signal includes a starting point determining module, a searching module and a symbol rate determining module. The starting point determining module finds a maximum energy in the spectral line and determines at least one search starting point according to the maximum energy. From the at least one search starting point, the searching module searches along the spectral line towards a region with a lower energy for at least one minimum energy satisfying a predetermined condition. The symbol rate determining module determines a symbol rate of the original signal according to the at least one minimum energy.

19 Claims, 2 Drawing Sheets

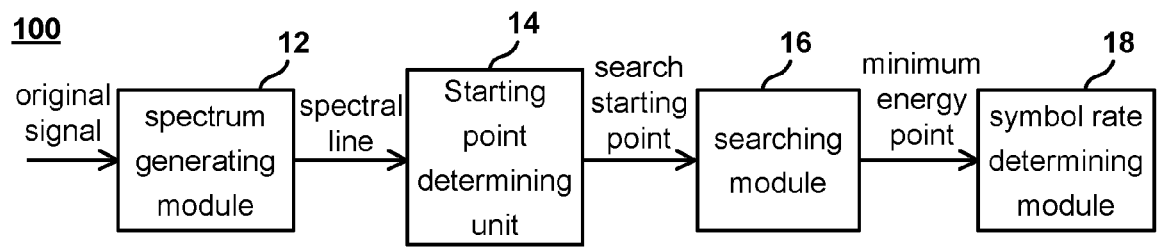
FIG. 1
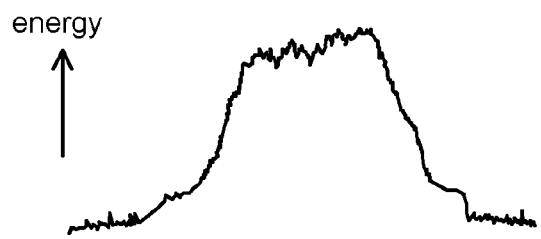
FIG. (2A)
FIG. (2B)
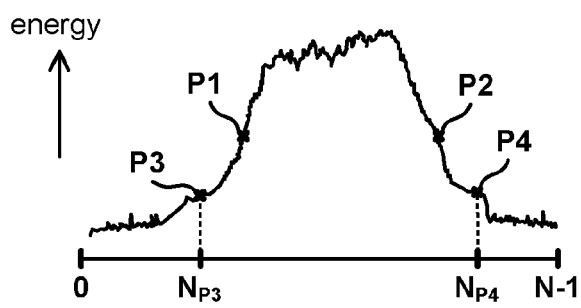
FIG. (2C)

US 9,203,677 B2

SIGNAL PROCESSING METHOD AND ASSOCIATED APPARATUS

This application claims the benefit of Taiwan application Serial No. 101110401, filed Mar. 26, 2012, the subject matter of which is incorporated herein by reference.

BACKGROUND OF THE INVENTION

1. Field of the Invention

The invention relates in general to a digital television broadcasting technique, and more particularly, to a technique for determining a symbol rate and a carrier frequency offset of a digital television signal.

2. Description of the Related Art

With advancements in communication techniques, digital television broadcasting continues to mature. In addition to being transmitted via cable, digital television signals can also be transmitted in the form of wireless signals via a base station or a satellite. The Digital Video Broadcasting—Satellite (DVB-S) and the Digital Video Broadcasting—Satellite—Second Generation (DVB-S2) are prevalent standards in digital television broadcasting.

In the DVB-S and DVB-S2 specifications, a symbol rate of digital television signals can be an arbitrary value between 0 to 45 MHz, which means the symbol rate can be any value in a wide range. Since a receiver cannot be informed of a carrier channel and a symbol rate selected at the transmitter in advance, the receiver must scan all channels and the entire symbol rate range to correctly decode and restore a received signal. However, the sequential scanning toward all parameter combinations by the receiver is extremely time consuming, and such an approach is not an ideal solution from both efficiency and performance perspectives.

SUMMARY OF THE INVENTION

To fulfill the need for determining a symbol rate and a carrier frequency offset in a digital television broadcasting system, the invention is directed to a signal processing apparatus and associated method. The signal processing apparatus and associated method searches for a minimum energy point of a spectrum according to a predetermined condition, and are capable of eliminating noise regions in the spectrum to further identify the symbol rate and the carrier frequency offset.

According to one embodiment the present invention, a signal processing apparatus is provided. The signal processing apparatus, receiving a spectral line corresponding to an original signal, comprises a starting point determining module, a searching module and a symbol rate determining module. The starting point determining module finds a maximum energy in the spectral line, and determines at least one search starting point according to the maximum energy. The searching module searches from the at least one search starting point along the spectral line towards a region having a lower energy for at least one minimum energy satisfying a predetermined condition. The symbol rate determining module determines a symbol rate of the original signal according to the at least one minimum energy.

According to another embodiment of the present invention, a signal processing method receiving a spectral line corresponding to an original signal is provided. The signal processing method comprises steps of: determining at least one search starting point by utilizing a maximum energy of the spectral line; searching for at least one minimum energy from the at least one search starting point along the spectral line towards a region having a lower energy, the at least one minimum energy satisfying a predetermined condition; and determining a symbol rate of the original signal according to the at least one minimum energy.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1 is a block diagram of a signal processing apparatus according to one embodiment of the present invention.

FIGS. 2A to 2C are examples of spectral lines and related dots according to embodiments of the present invention.

DETAILED DESCRIPTION OF THE INVENTION

Figure 3:
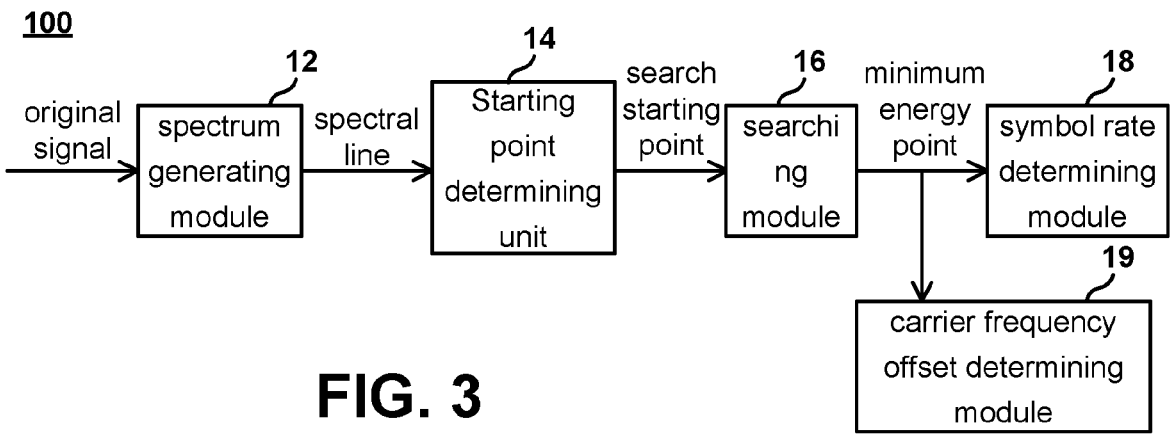
FIG. 3 is a block diagram of a signal processing apparatus further comprising a carrier frequency offset determining module according to another embodiment of the present invention.

FIG. 1 shows a signal processing apparatus 100 according to one embodiment of the present invention. The signal processing apparatus 100 comprises a spectrum generating module 12, a starting point determining module 14, a searching module 16 and a symbol rate determining module 18. In practice, for example, the signal processing module 100 may be integrated in a DVB-S or DVB-S2 compliant digital television signal receiver.

The spectrum generating module 12 receives and analyzes an original signal to generate a spectral line of the original signal. Assuming the signal processing apparatus 100 is configured in a digital television signal receiver, the original signal may be a digital television signal of a particular channel. In practice, the spectrum generating unit 12 may divide a digital input signal into multiple segments (e.g., 32 segments or 64 segments), perform fast Fourier transform (FFT) and superimpose energy square values of all transform results into a superimposed result. That is, the spectral line is in fact composed of many dots corresponding to different frequencies/energies. The spectrum generating unit 12 may further perform a smoothing procedure (e.g., through a moving average circuit) on the superimposed result to filter and remove a portion of the noise in the spectral line. FIG. 2A shows an example of a spectral line generated by the spectrum generating unit 12.

In this embodiment, the starting point determining module 14 first finds a maximum energy 'max' and an initial minimum energy 'min' in the spectral line, as indicated in FIG. 2B. Referring to FIG. 2B, it is possible that a region demarcated by a dotted line 20 contains energy contributed by noise. Thus, with respect to a symbol rate and/or a carrier frequency of the original signal, a result determined and obtained directly based on the maximum energy 'max' and the initial minimum energy 'min' may contain an error. Details of how the signal processing apparatus 100 prevents such issue of misjudging symbol rate and/or carrier frequency offset due to noise interference are described below.

In this embodiment, after finding the maximum energy max and the initial minimum energy min in the spectral line, the starting point determining module 14 determines at least one search starting point according to the maximum energy max and the initial minimum energy min. For example, the starting point determining module 14 calculates an average 'avg' of the maximum energy 'max' and the initial minimum energy 'min', and identifies from the spectral line two points P1 and P2 corresponding to the average avg as the search starting points. In a situation where the initial energy is very small, the average 'avg' is approximately a half of the maximum energy 'max', i.e., lower than the maximum energy 'max' by approximately 3 dB. It should be noted that the energy value corresponding to the search starting point is not limited to the average 'avg' of the maximum energy 'max' and the initial minimum energy 'min', and may be any energy value between the maximum energy 'max' and the initial minimum energy 'min', or even the maximum energy 'max' itself.

In another embodiment, the starting point determining module 14 may locate the maximum energy 'max' in the spectral line, and utilize at least one point lower than the maximum energy 'max' by a predetermined value as a search starting point. In other words, the search starting point is not necessarily selected based on the minimum energy 'min'. Further, in another embodiment, the starting point determining module 14 may also select either the point P1 or the point P2 as the search starting point.

After the starting point determining module 14 selects and determines the search starting points P1 and P2, the searching module 16 respectively searches from the search starting points P1 and P2 along the spectral line towards a region having a lower energy for at least one minimum energy point satisfying a predetermined condition. Taking the situation in FIG. 2B for example, the searching module 16 searches from the search starting point P1 towards the left of the spectral line, and searches from the search starting point P2 towards the right of the spectral line. In another embodiment, assuming that only one search starting point is available, the searching is performed respectively towards the left and right of the spectral line.

In this embodiment, the predetermined condition includes a condition that an absolute value of a slope corresponding to the minimum energy point in the spectral line is smaller than a slope threshold. As previously stated, the spectral line in fact includes multiple dots corresponding to different frequencies/energies. With respect to the search from the search starting point P1, dots that are more away from the search starting point P1 have lower energies and thus correspond to smaller slope absolute values. The searching module 16 may be designed to select one dot of one of multiple dots as the minimum energy point after finding that the slope absolute value corresponding to the one dot or multiple dots is smaller than a predetermined value. Referring to FIG. 2C, the searching module 16 finds two minimum energy points P3 and P4 respectively corresponding to the search starting points P1 and P2 after searching, with the minimum energy points P3 and P4 satisfying the predetermined condition adopted by the searching module 16. Compared to the initial minimum energy 'min' determined by the starting point determining module 14, the energies corresponding to the minimum energy points P3 and P4 more approach the real minimum signal energy.

In another embodiment, the searching module 16 may be designed to continuously and selectively update the slope threshold according to a latest search result. Assuming that the horizontal spacings of the dots in the spectral line are equal, the energy difference between each two adjacent dots is equivalently one relative slope. For example, the slope threshold may be set as $\Delta_{MAX}/10$, where $\Delta_{MAX}$ represents a currently found maximum energy difference between two dots in searching. When a latest energy difference is greater than a previous energy difference, the searching module 16 modifies the slope threshold $\Delta_{MAX}/10$ according to the latest energy difference. Correspondingly, the predetermined condition adopted by the searching module 16 may be $$E(i+1) - E(i) < \frac{\Delta_{MAX}}{10}$$

successively occurring for five times, where E(i+1) represents the energy of a next dot, and E(i) represents the energy of the current dot.

The predetermined condition of the searching module 16 may further include a condition that the energy difference between the minimum energy and the maximum energy 'max' is greater than an energy threshold. For example, the predetermined condition may be both $$E(i+1) - E(i) < \frac{\Delta_{MAX}}{10}$$

and [avg−E(i+1)]>(max−avg)*3/4 successively occurring for five times, where avg represents the previous average energy, and max represents the maximum energy determined by the starting point determining module 14.

After the searching module 16 finds the minimum energy points P3 and P4, the symbol rate determining module 18 determines a symbol rate of the original signal according to the minimum energy points P3 and P4. In this embodiment, the symbol rate determining module 18 first calculates a frequency difference ΔF corresponding to the two minimum energy points P3 and P4, and divides the frequency difference ΔF by a roll-off factor to obtain the symbol rate of the original signal. The equation is as follows:

$$\Delta F = \frac{N_{P4} - N_{P3}}{N} * R,$$

where N represents a computing point from the aforementioned FFT, $N_{P3}$ and $N_{P4}$ respectively represent horizontal coordinates corresponding to the minimum energy points P3 and P4, and R represents a sampling frequency of the original signal. The above sampling may be performed by the spectrum generating module 12, or by a front-end receiving circuit disposed in the spectrum generating module 12. The size of the roll-off factor varies depending on different signals or hardware characteristics of the receiving circuit. For example, a range of the roll-off factor may be between 1.2 and 1.5.

In another embodiment, the symbol rate determining module 18 reassesses a modified average energy avg' according to the maximum energy max and the minimum energy points P3 and P4, and regards a frequency difference between two intersections of the spectral line and the modified average energy avg' as the symbol rate of the original signal.

Referring to FIG. 3, the signal processing apparatus 10 may further comprise a carrier frequency offset (CFO) determining module 19 for determining the carrier frequency offset of the original signal according to the two minimum energy points P3 and P4. In this embodiment, the carrier frequency offset determining module 19 reassesses the modified average energy avg' according to the maximum energy max and the minimum energy points P3 and P4, and utilizes the two intersections of the spectral line and the modified average energy avg' as modified search starting points P1' and P2'. The carrier frequency offset determining module 19 calculates the carrier frequency offset according to the equation below:

$$CFO = \frac{\left(\frac{N_{P1'} + N_{P2'}}{2} - \frac{N}{2}\right)}{N} * R$$

It is seen from the above equation that the carrier frequency offset determining module 19 calculates an average frequency corresponding to the two modified search starting points P1' and P2', and adopts a difference between the average frequency and a central frequency of the spectrum as the carrier frequency offset of the original signal. In practice, a subsequent circuit may further be used to fine-tune the symbol rate and/or the carrier frequency offset generated by the signal processing apparatus 100.

It is understood from the above descriptions that the signal processing apparatus 100 of the present invention, by searching for the minimum energy point having a higher accuracy according to the predetermined condition, eliminates the noise region demarcated by the dotted line 20 to prevent from misjudging symbol rate and carrier frequency offset.

Figure 4:
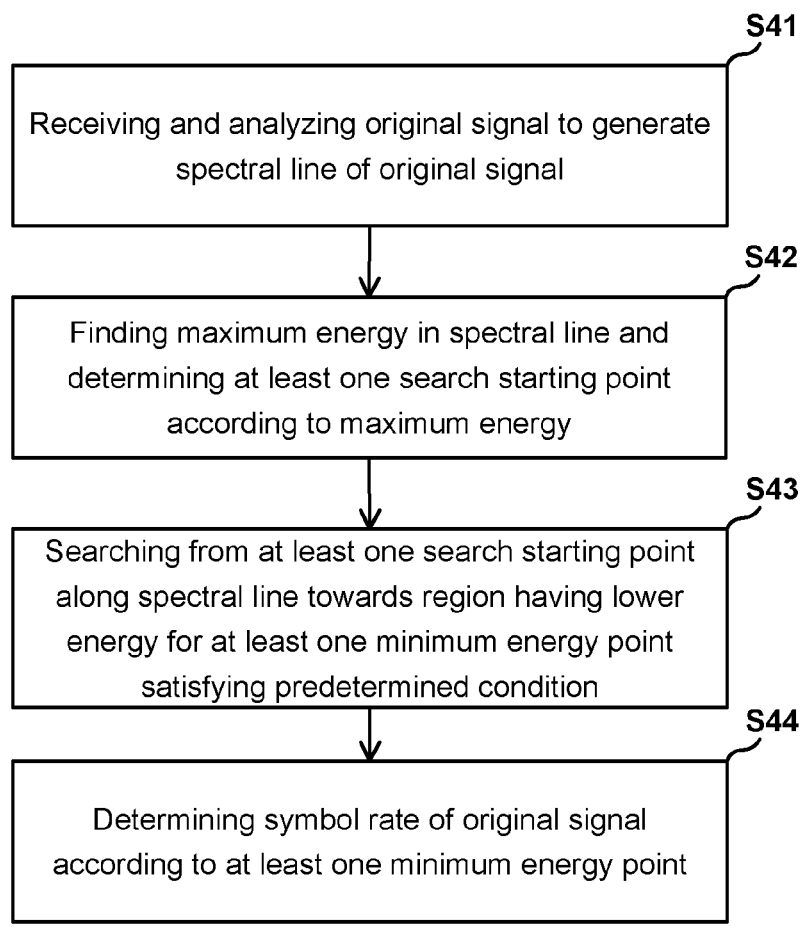
FIG. 4 is a flowchart of a signal processing method according to one embodiment of the present invention.

According to another embodiment of the present invention, a signal processing method is provided, as shown in FIG. 4. In Step S41, an original signal is received and analyzed to generate a spectral line of the original signal. In Step S42, a maximum energy in the spectral line is found, and at least one search starting point is determined according to the maximum energy. In Step S43, from the at least one starting point, searching along the spectral line is performed toward a region having a lower energy for at least one minimum energy point satisfying a predetermined condition. In Step S44, a symbol rate of the original signal is determined according to the at least one minimum energy point.

It should be noted that variations in the circuit operation process (e.g., the method for determining the search starting point, the predetermined condition for searching the minimum energy point, the method for determining the symbol rate, and the method for determining the carrier frequency offset) of the signal processing apparatus 100 may also be applied to the signal processing method in FIG. 4, and details thereof shall be omitted herein.

It is noted that the block diagrams of FIGS. 1 and 3 may be implemented in hardware or software or a combination thereof. Hardware may include one or more electronic processors, associated memory and connection circuitry. The hardware may also include, e.g., an application specific integrated circuit (ASIC) configured to perform the functionality described herein.

In conclusion, to fulfill the need for determining a symbol rate and a carrier frequency offset in a digital television broadcasting system, the invention provides a signal processing apparatus and associated method. The signal processing apparatus and associated method searches for the minimum energy point of the spectrum according to the predetermined condition, and is capable of eliminating the noise region in the spectrum, so as to further identify the reliable symbol rate and carrier frequency offset and sparing possible complications in sequentially scanning different symbol rates.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing apparatus, receiving a spectral line corresponding to an original signal, comprising:
    a starting point determining module, for finding a maximum energy of the spectral line and determining at least one search starting point according to the maximum energy;
    a searching module, for searching for at least one minimum energy from the at least one search starting point along the spectral line towards a region having a lower energy, the at least one minimum energy satisfying a predetermined condition; and
    a symbol rate determining module, for determining a symbol rate of the original signal according to the at least one minimum energy.

2. The apparatus according to claim 1, wherein the starting point determining module further finds an initial minimum energy in the spectral line, and determines the at least one search starting point according to the maximum energy and the initial minimum energy.

3. The apparatus according to claim 2, wherein the starting point determining module selects an intermediate energy between the maximum energy and the initial minimum energy, and the at least one search starting point corresponds to the intermediate energy.

4. The apparatus according to claim 1, wherein an energy corresponding to the search starting point is lower than a predetermined value, which is lower than the maximum energy.

5. The apparatus according to claim 1, wherein the starting point determining module further determines two search starting points, and the searching module respectively searches from the two search starting points along the spectral line towards regions having a lower energy to find two minimum energies satisfying the predetermined condition.

6. The apparatus according to claim 5, wherein the symbol rate determining module calculates a frequency difference corresponding to the two minimum energies, and generates the symbol rate according to the frequency difference and a predetermined roll-off factor.

7. The apparatus according to claim 5, further comprising:
    a carrier frequency offset determining module, for modifying the two search starting points and an average frequency corresponding to the search starting points according to the two minimum energies, and adopts a difference between the average frequency and a spectrum central frequency as a carrier frequency offset of the original signal.

8. The apparatus according to claim 1, wherein the predetermined condition comprises a condition when a slope corresponding to the at least one minimum energy in the spectral line is smaller than a slope threshold.

9. The apparatus according to claim 8, wherein the searching module selectively updates the slope threshold according to a latest energy difference between a current search result and a previous search result and increases the slope threshold according to the latest energy difference when the latest energy difference is greater than a current maximum energy difference.

10. The apparatus according to claim 8, wherein the predetermined condition further comprises an energy difference between the minimum energy and the maximum energy being greater than an energy threshold.

11. A signal processing method, including receiving a spectral line corresponding to an original signal, comprising:
   a) determining at least one search starting point by utilizing a maximum energy of the spectral line;
   b) searching for at least one minimum energy from the at least one search starting point along the spectral line towards a region having a lower energy, the at least one minimum energy satisfying a predetermined condition; and
   c) determining a symbol rate of the original signal according to the at least one minimum energy,
   wherein step (a) further comprises finding an initial minimum energy of the spectral line, and determining the at least one search starting point according to the maximum energy and the initial minimum energy.

12. The method according to claim 11, wherein step (a) comprises selecting an intermediate energy between the maximum energy and the initial minimum energy, and the at least one search starting point corresponds to the intermediate energy.

13. The method according to claim 11, wherein an energy corresponding to the search starting point is lower than a predetermined value, which is lower than the maximum energy.

14. The method according to claim 11, wherein step (a) comprises determining two search starting points, and step (b) comprises searching from the two search starting point along the spectral line towards regions having a lower energy to find two minimum energies satisfying the predetermined condition.

15. The method according to claim 14, wherein step (c) comprises:
   calculating a frequency difference corresponding to the two minimum energies; and
   generating the symbol rate according to the frequency difference and a predetermined roll-off factor.

16. The method according to claim 14, further comprising:
   modifying the two search starting points and an average frequency corresponding to the search starting points according to the two minimum energies, and adopting a difference between the average frequency and a spectrum central frequency as a carrier frequency offset of the original signal.

17. The method according to claim 11, wherein the predetermined condition comprises a slope corresponding to the at least one minimum energy of the spectral line being smaller than a slope threshold.

18. The method according to claim 17, wherein step (b) further comprises:
   selectively updating the slope threshold according to a latest energy difference between a current search result and a previous search result, and increasing the slope threshold according to the latest energy difference when the latest energy difference is greater than a current maximum energy difference.

19. The method according to claim 17, wherein the predetermined condition further comprises a condition when an energy difference between the minimum energy and the maximum energy is greater than an energy threshold.

\* \* \* \* \*